United States Patent
Hosokoshiyama et al.

(10) Patent No.: US 11,780,633 B2
(45) Date of Patent: Oct. 10, 2023

(54) SYNTHETIC RESIN-MADE CONTAINER, PREFORM, AND METHOD OF MANUFACTURING SYNTHETIC RESIN-MADE CONTAINER

(71) Applicant: YOSHINO KOGYOSHO CO., LTD., Tokyo (JP)

(72) Inventors: Hiroshi Hosokoshiyama, Tokyo (JP); Yuichi Okuyama, Tokyo (JP); Junichi Chiba, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 479 days.

(21) Appl. No.: 16/958,799

(22) PCT Filed: Nov. 1, 2018

(86) PCT No.: PCT/JP2018/040754
§ 371 (c)(1),
(2) Date: Jun. 29, 2020

(87) PCT Pub. No.: WO2019/130812
PCT Pub. Date: Jul. 4, 2019

(65) Prior Publication Data
US 2020/0324931 A1   Oct. 15, 2020

(30) Foreign Application Priority Data
Dec. 28, 2017  (JP) ................. 2017-254564

(51) Int. Cl.
*B65D 1/02*      (2006.01)
*B29C 49/12*     (2006.01)
(Continued)

(52) U.S. Cl.
CPC ............ *B65D 1/0215* (2013.01); *B29C 49/12* (2013.01); *B29C 49/6409* (2013.01); *B65D 1/40* (2013.01);
(Continued)

(58) Field of Classification Search
CPC .... B65D 1/0215; B65D 1/40; B29C 49/6049; B29C 2949/0746; B29L 2031/7158
See application file for complete search history.

(56) References Cited

U.S. PATENT DOCUMENTS

2001/0016239 A1   8/2001   Koch et al.
2004/0065984 A1   4/2004   Ota et al.
(Continued)

FOREIGN PATENT DOCUMENTS

JP   2001-206336 A   7/2001
JP   2005-47538 A    2/2005
(Continued)

OTHER PUBLICATIONS

Oct. 5, 2021 Search Report issued in European Patent Application No. 18893503.5.
Jan. 15, 2019 International Search Report issued in International Patent Application No. PCT/JP2018/040754.
May 14, 2021 Office Action issued in Chinese Patent Application No. 201880082961.8.

*Primary Examiner* — Andrew T Kirsch
(74) *Attorney, Agent, or Firm* — Oliff PLC

(57) ABSTRACT

A synthetic resin-made container has an outer layer body and an inner layer body separably laminated on an inner surface of the outer layer body and is formed by stretch blow molding, and has: a tubular mouth portion; a shoulder portion located below the mouth portion and increasing in diameter downward; a barrel portion connected to and located below the shoulder portion; and a bottom portion closing a lower end of the barrel portion, wherein the mouth portion has an outside air introduction hole for introducing outside air into a space between the outer layer body and the
(Continued)

inner layer body, and the inner layer body is made of a crystalline resin, and has, in at least a part of the mouth portion in the inner layer body, a crystallized region having a higher degree of crystallinity than other regions.

8 Claims, 6 Drawing Sheets

(51) Int. Cl.
  *B29C 49/64* (2006.01)
  *B65D 1/40* (2006.01)
  *B29L 31/00* (2006.01)

(52) U.S. Cl.
  CPC .............. *B29C 2949/0746* (2022.05); *B29C 2949/3032* (2022.05); *B29C 2949/3034* (2022.05); *B29L 2031/7158* (2013.01)

(56) References Cited

U.S. PATENT DOCUMENTS

| | | |
|---|---|---|
| 2015/0210523 A1* | 7/2015 | Witte .................. B67D 1/0462 222/394 |
| 2016/0083581 A1 | 3/2016 | Ishii et al. |
| 2016/0236820 A1 | 8/2016 | Paauwe et al. |

FOREIGN PATENT DOCUMENTS

| | | |
|---|---|---|
| JP | 2005-047593 A | 2/2005 |
| JP | 2012-116516 A | 6/2012 |
| JP | 2013-208798 A | 10/2013 |
| JP | 2017-214127 A | 12/2017 |
| WO | 2014/156701 A1 | 10/2014 |

* cited by examiner

SECTION A-A

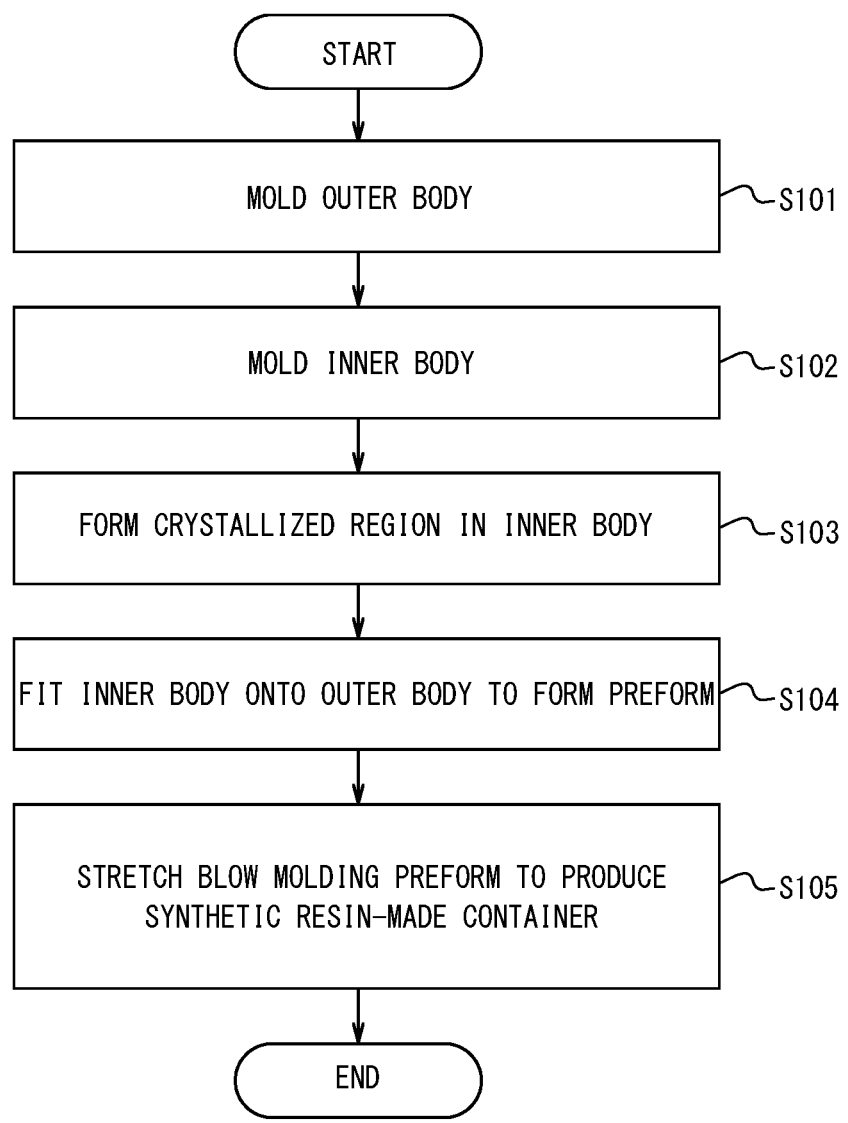

SYNTHETIC RESIN-MADE CONTAINER, PREFORM, AND METHOD OF MANUFACTURING SYNTHETIC RESIN-MADE CONTAINER

CROSS REFERENCE TO RELATED APPLICATION

This application claims priority to and the benefit of Japanese Patent Application No. 2017-254564 filed on Dec. 28, 2017, the entire disclosure of which is incorporated herein by reference.

TECHNICAL FIELD

The present disclosure relates to a synthetic resin-made container having an outer layer body and an inner layer body separably laminated on the inner surface of the outer layer body, a preform, and a method of manufacturing a synthetic resin-made container.

BACKGROUND

Delamination containers are conventionally known as containers for containing food seasonings such as soy sauce, beverages, cosmetics such as skin lotions, and toiletries such as shampoos, hair conditioners, and liquid soaps as content liquids (for example, see PTL 1).

Such a delamination container has a double structure in which an inner layer body having a space for containing a content liquid and capable of volume-reduction deformation is separably laminated on the inner surface of an outer layer body forming an outer shell of the container and including a tubular mouth portion, a barrel portion connected to the mouth portion, and a bottom portion closing the lower end of the barrel portion. The delamination container is used, for example, as a squeeze-type discharge container combined with a discharge cap having a check valve, or a pump-type container combined with a pump. In this case, the content liquid can be discharged to the outside by squeezing (compressing) the barrel portion of the outer layer body or operating the pump. After discharging the content liquid, by introducing outside air between the inner layer body and the outer layer body from an outside air introduction hole formed in the outer layer body, the outer layer body can be restored to the original shape while the inner layer body remains volume-reduction deformed. With such a delamination container, the content liquid contained in the inner layer body can be discharged without replacing it with outside air, so that contact of the content liquid contained in the inner layer body with outside air can be reduced and degradation or degeneration of the content liquid can be suppressed.

For example, the delamination container can be manufactured by stretch blow molding an outer body made of an olefin-based synthetic resin material such as polypropylene (PP) or polyethylene (PE) and an inner body located on the radially inner side of the outer body and made of a synthetic resin material having low compatibility with the synthetic resin material for the outer body, such as nylon or ethylene-vinyl alcohol copolymer resin (EVOH).

CITATION LIST

Patent Literature

PTL 1: JP 2012-116516 A

SUMMARY

Technical Problem

In the case where the delamination container manufactured by stretch blow molding the double preform has the outside air introduction hole in the mouth portion, the unstretched part of the inner body near the outside air introduction hole may expand radially outward during blow molding and block the air passage from the outside air introduction hole to the space between the outer layer body and the inner layer body in the barrel portion. This leaves room for improvement.

It could therefore be helpful to provide a synthetic resin-made container, a preform, and a method of manufacturing a synthetic resin-made container that can easily secure an air passage from an outside air introduction hole to a barrel portion.

Solution to Problem

A synthetic resin-made container according to the present disclosure is a synthetic resin-made container that has an outer layer body and an inner layer body separably laminated on an inner surface of the outer layer body and is formed by stretch blow molding, the synthetic resin-made container comprising: a tubular mouth portion; a shoulder portion located below the mouth portion and increasing in diameter downward; a barrel portion connected to and located below the shoulder portion; and a bottom portion closing a lower end of the barrel portion, wherein the mouth portion has an outside air introduction hole for introducing outside air into a space between the outer layer body and the inner layer body, and the inner layer body is made of a crystalline resin, and has, in at least a part of the mouth portion in the inner layer body, a crystallized region having a higher degree of crystallinity than other regions.

Preferably, in the synthetic resin-made container according to the present disclosure, the crystallized region has lower visible light transmittance than the other regions.

Preferably, in the synthetic resin-made container according to the present disclosure, the crystallized region is a predetermined region below a neck ring formed in the mouth portion.

Preferably, in the synthetic resin-made container according to the present disclosure, the shoulder portion has a vertical rib extending in a vertical direction, the vertical rib being concave or convex.

Preferably, in the synthetic resin-made container according to the present disclosure, a groove depth of the vertical rib that is concave or a projection height of the vertical rib that is convex is smaller in at least one of an upper end and a lower end of the vertical rib than in a center of the vertical rib.

Preferably, in the synthetic resin-made container according to the present disclosure, the crystallized region extends to at least an upper end of the vertical rib.

A preform according to the present disclosure is a preform that is made of a synthetic resin, has an outer body and an inner body laminated on an inner surface of the outer body, and is used in stretch blow molding, the preform comprising: a tubular mouth portion; a barrel portion located below the mouth portion; and a bottom portion closing a lower end of the barrel portion, wherein the mouth portion has an outside air introduction hole formed through the outer body, and the inner body is made of a crystalline resin, and has, in at least a part of the mouth portion in the inner body, a crystallized region having a higher degree of crystallinity than other regions.

Preferably, in the preform according to the present disclosure, the crystallized region is an unstretched part in the stretch blow molding.

Preferably, in the preform according to the present disclosure, an air passage rib extending in a vertical direction is formed on an outer circumferential surface in at least a part of the crystallized region.

Preferably, in the preform according to the present disclosure, the air passage rib extends from the outside air introduction hole to the crystallized region.

A method of manufacturing a synthetic resin-made container according to the present disclosure is a method of manufacturing a synthetic resin-made container by stretch blow molding a preform that has an outer body and an inner body laminated on an inner surface of the outer body, the preform including: a tubular mouth portion; a barrel portion located below the mouth portion; and a bottom portion closing a lower end of the barrel portion, wherein the mouth portion has an outside air introduction hole formed through the outer body, the method comprising: molding the outer body and the inner body that is made of a crystalline resin; reheating and cooling at least a part of the mouth portion in the inner body, to form a crystallized region having a higher degree of crystallinity than other regions; fitting the inner body having the crystallized region onto an inner circumferential surface of the outer body, to form a preform; and stretch blow molding the preform to form a synthetic resin-made container.

In the method of manufacturing a synthetic resin-made container according to the present disclosure, the cooling of the at least a part of the mouth portion in the inner body is slow cooling without forced cooling.

Advantageous Effect

It is thus possible to provide a synthetic resin-made container, a preform, and a method of manufacturing a synthetic resin-made container that can easily secure an air passage from an outside air introduction hole to a barrel portion.

BRIEF DESCRIPTION OF THE DRAWINGS

In the accompanying drawings:

FIG. 6 is a flowchart illustrating a procedure of a method of manufacturing a synthetic resin-made container according to one of the disclosed embodiments.

DETAILED DESCRIPTION

More detailed description will be given below with reference to the drawings.

Figure 1:
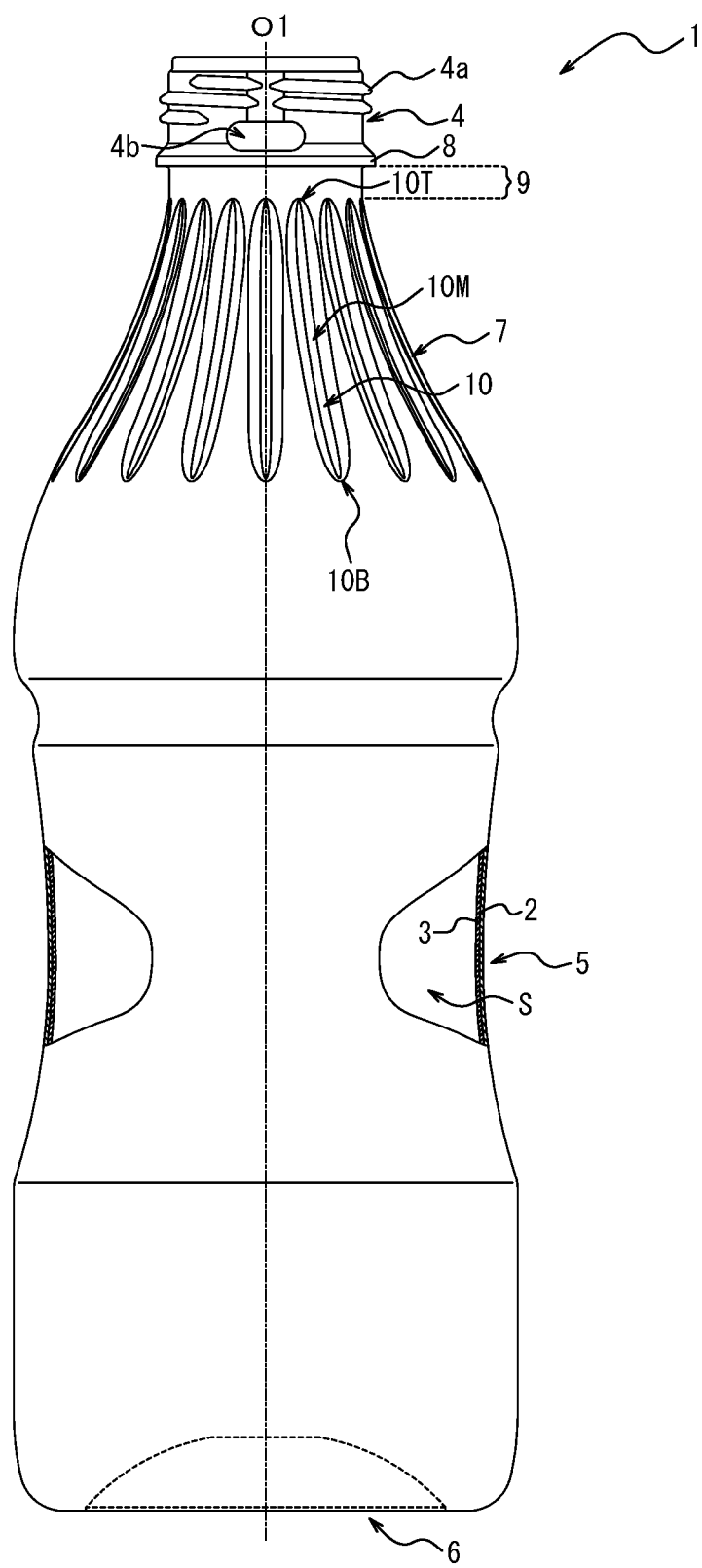
FIG. 1 is a partial front sectional view of a synthetic resin-made container according to one of the disclosed embodiments.
Figure 2:
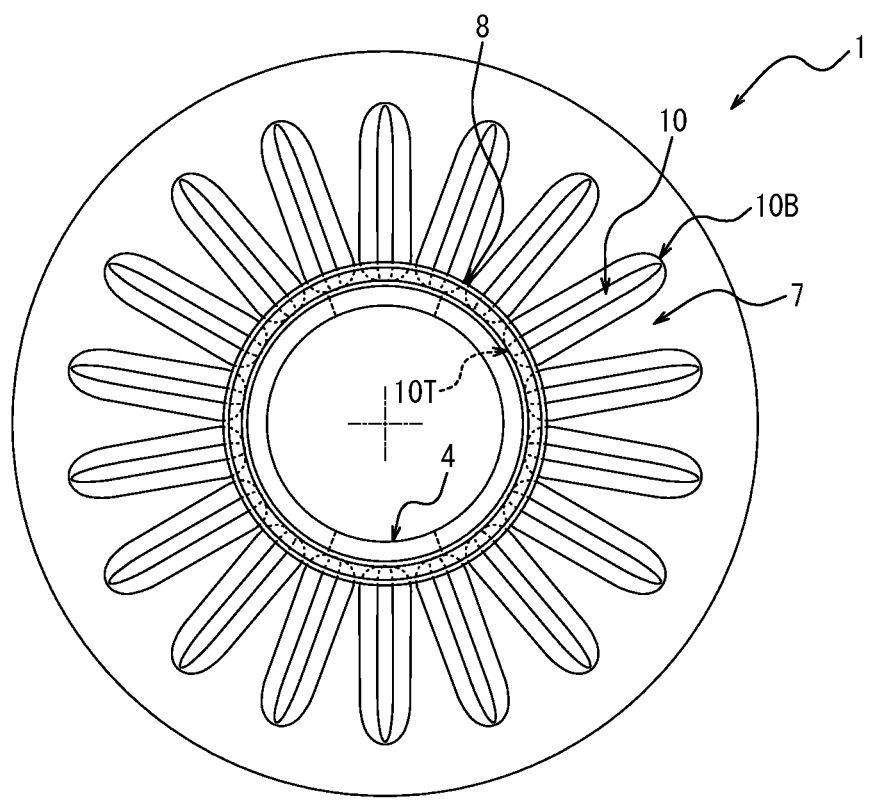
FIG. 2 is a plan view of the synthetic resin-made container according to one of the disclosed embodiments.

A synthetic resin-made container 1 according to one of the disclosed embodiments illustrated in FIGS. 1 and 2 is called a delamination container, and has a double structure including an outer layer body 2 and an inner layer body 3. The external shape of the synthetic resin-made container 1 is a bottle shape including a cylindrical mouth portion 4, a shoulder portion 7 located below the mouth portion 4 and increasing in diameter downward, a cylindrical barrel portion 5 connected to and located below the shoulder portion 7, and a bottom portion 6 closing the lower end of the barrel portion 5.

In the description, the claims, and the drawings, the term "vertical direction" (upward-downward) refers to an upward-downward direction in a state in which the synthetic resin-made container 1 is in an upright position as illustrated in FIG. 1. The term "radially outward" refers to a direction toward the outside along a straight line that passes the central axis O1 of the synthetic resin-made container 1 and is perpendicular to the central axis O1 in FIG. 1. The term "radially inward" refers to a direction toward the central axis O1 along the straight line.

The mouth portion 4 has a male screw 4a. A discharge member such as a discharge cap or a discharge pump can be attached to the mouth portion 4 by screw connection to the male screw 4a. The mouth portion 4 may have an annular protrusion instead of the male screw 4a so that a discharge member such as a discharge cap can be attached to the mouth portion 4 by undercut engagement through capping. A lower part of the mouth portion 4 is provided with a neck ring 8 for fixing to a mold for blow molding when molding the synthetic resin-made container 1 by, for example, stretch blow molding.

An example in which the synthetic resin-made container 1 is used as a squeeze-type discharge container will be described below.

The outer layer body 2 forms an outer shell of the synthetic resin-made container 1, and may be made of a synthetic resin material such as polypropylene (PP), polyethylene (PE), or polyethylene terephthalate (PET). The part of the outer layer body 2 corresponding to the barrel portion 5 is flexible, and can dent when squeezed (compressed) and also return to the original shape from the dented state. In the case where the synthetic resin-made container 1 is used as a pump-type container, the part of the outer layer body 2 corresponding to the barrel portion 5 need not be squeezable.

The inner layer body 3 may be made of a synthetic resin material, such as nylon or ethylene-vinyl alcohol copolymer resin (EVOH), that is a crystalline resin and has low compatibility with the synthetic resin material forming the outer layer body 2, in a bag shape thinner than the outer layer body 2. The inner layer body 3 is separably laminated on the inner surface of the outer layer body 2. The inside of the inner layer body 3 is a containing portion S connected to the opening of the mouth portion 4, and is capable of containing, for example, any of food seasonings such as soy sauce, beverages, cosmetics such as skin lotions, and toiletries such as shampoos, hair conditioners, and liquid soaps as contents.

The crystalline resin included in the inner layer body 3 is a resin that is classified as thermoplastic resin and has crystalline parts in which molecular chains are regularly arranged. Crystalline parts and amorphous parts are mixed in the crystalline resin. The proportion of crystalline parts and amorphous parts depends on, for example, the cooling rate when cooling the crystalline resin after heating. Typically, in the case where a crystalline resin is slow-cooled after heating, the proportion of crystalline parts increases. A crystalline resin having a higher proportion of crystalline parts, i.e. a higher degree of crystallinity, has lower light transmittance because diffusion and reflection of light occur due to the refractive index difference between crystalline parts and amorphous parts. A crystalline resin having a high degree of crystallinity tends to have high rigidity. The degree of crystallinity can be measured, for example, by a density method, an X-ray diffraction method, a method by differential scanning calorimetry (DSC), a FT-IR method, or a solid state NMR method.

The mouth portion 4 of the outer layer body 2 has an outside air introduction hole 4b for introducing outside air between the outer layer body 2 and the inner layer body 3, as illustrated in FIG. 1. The outside air introduction hole 4b preferably has a function as a check valve or has a check valve attached thereto so as to introduce outside air between the outer layer body 2 and the inner layer body 3 but prevent air existing between the outer layer body 2 and the inner layer body 3 from flowing outside. The outside air introduction hole 4b may not be provided with a check valve or a check valve function. The shape of the outside air introduction hole 4b is not limited to a long hole shape illustrated in the drawing, and may be any of other various shapes such as a circular shape.

The synthetic resin-made container 1 having such a structure can form a discharge container when a discharge member such as a discharge cap is attached to the mouth portion 4. In this case, by squeezing (compressing) the part of the outer layer body 2 corresponding to the barrel portion 5, the contents can be discharged to the outside from the discharge member, and, with the discharge of the contents, the inner layer body 3 can separate from the inner surface of the outer layer body 2 and volume-reduction deform. After the squeeze is released, outside air is introduced between the outer layer body 2 and the inner layer body 3 from the outside air introduction hole 4b formed in the outer layer body 2, as a result of which the outer layer body 2 can return to the original shape while the inner layer body 3 remains volume-reduction deformed. In this way, the contents contained in the containing portion S can be discharged without replacing the contents with outside air, so that contact of the contents contained in the containing portion S with outside air can be reduced and degradation and degeneration of the contents can be suppressed.

The synthetic resin-made container 1 according to the present disclosure has a crystallized region 9 in a predetermined region below the neck ring 8 in the mouth portion 4, as illustrated in FIG. 1. The crystallized region 9 is a region whose light transmittance has decreased as a result of increasing the degree of crystallinity to such an extent that whitens the inner layer body 3 in the region. The synthetic resin-made container 1 is formed by stretch blow molding, with a neck ring 18 of a preform 11 (see FIG. 3B, etc.) corresponding to the neck ring 8 in FIG. 1 being fixed to a mold for blow molding. Here, the region which is an unstretched part below the neck ring 8 tends to expand radially outward due to high pressure air from the inside during the stretch blow molding. In such a case, there is a possibility that the air passage formed between the inner layer body 3 and the outer layer body 2 is blocked and the movement of air from the outside air introduction hole 4b to the space between the outer layer body 2 and the inner layer body 3 in the barrel portion 5 is obstructed. In this embodiment, in the crystallized region 9 illustrated in FIG. 1, the degree of crystallinity is increased to such an extent that whitens the inner layer body 3, thus increasing the elastic modulus and securing high rigidity. Consequently, the deformation of the inner layer body 3 in the crystallized region 9 during the stretch blow molding can be suppressed, with it being possible to prevent the obstruction of the movement of air from the outside air introduction hole 4b to the barrel portion 5. Herein, "whitening" refers to a state in which the light transmittance decreases as a result of increasing the degree of crystallinity in the crystalline resin as mentioned above, and the color is not limited to white.

In this embodiment, the crystallized region 9 is formed in the predetermined region below the neck ring 8, as illustrated in FIG. 1.

However, the present disclosure is not limited to such. The crystallized region 9 may include the neck ring 8, or extend to a position above the neck ring 8. For example, the crystallized region 9 may extend to the height of the outside air introduction hole 4b. The crystallized region 9 may also extend to the shoulder portion 7 over the lower end of the mouth portion 4.

In this embodiment, the crystallized region 9 has a higher elastic modulus than the other regions, and resists stretching during the stretch blow molding. Thus, the air passage in the gap between the outer body 12 and the inner body 13 can be secured. If the crystallized region 9 is not provided, even the region near and below the neck ring 18 is stretched during the blow molding, as a result of which the air passage in the gap between the outer body 12 and the inner body 13 is blocked.

The shoulder portion 7 in the synthetic resin-made container 1 has at least one vertical rib 10 extending in the vertical direction, as illustrated in FIG. 1. As a result of the shoulder portion 7 having the vertical rib 10, a gap is formed between the inner layer body 3 and the outer layer body 2 in the surrounding region of the vertical rib 10 after initial separation treatment of separating the inner layer body 3 from the outer layer body 2 by a method such as blowing air in from the outside air introduction hole 4b and restoring the inner layer body 3 to the original shape by injecting air from the upper end opening of the mouth portion 4. By forming such a gap between the inner layer body 3 and the outer layer body 2 in the surrounding region of the vertical rib 10, outside air can be easily introduced between the inner layer body 3 and the outer layer body 2 from the outside air introduction hole 4b through the gap during use (i.e. when discharging the contents).

In particular, in this embodiment, the crystallized region 9 and the upper end 10T of the vertical rib 10 are formed continuously, as illustrated in FIG. 1. Accordingly, outside air introduced from the outside air introduction hole 4b can easily reach the vertical rib 10, because the air passage between the outer layer body 2 and the inner layer body 3 in the crystallized region 9 is secured. The outside air that has reached the vertical rib 10 can easily reach the barrel portion 5 through the gap between the outer layer body 2 and the inner layer body 3 in the vertical rib 10, thus allowing smooth contraction of the inner layer body 3.

In this embodiment, the height of the lower end of the crystallized region 9 and the height of the upper end 10T of the vertical rib 10 approximately match, as illustrated in FIG. 1. However, the present disclosure is not limited to such. The crystallized region 9 and the vertical rib 10 may overlap each other in the height direction. The vertical rib 10 and the crystallized region 9 may be away from each other in the height direction, or the vertical rib 10 may be omitted.

In this embodiment, 18 vertical ribs 10 are arranged at regular intervals in the circumferential direction, as illustrated in FIG. 2. The number of vertical ribs 10, the length of each vertical rib 10, and the like may be varied.

In this embodiment, each vertical rib 10 is formed as a concave rib that extends in the vertical direction and is depressed toward the inside of the container. In the part where the vertical rib 10 is formed, the shape of the inner layer body 3 is a concave rib shape corresponding to the shape of the outer layer body 2.

The groove depth of the vertical rib 10 is smaller in the upper end 10T and the lower end 10B than in the central part 10M in the vertical direction. As a result of the groove depth being smaller in the upper end 10T and the lower end 10B, the inner layer body 3 can easily separate from the outer layer body 2 at the vertical rib 10 in the initial separation treatment.

In the synthetic resin-made container 1 according to this embodiment, the groove depth of the vertical rib 10 is smaller in the upper end 10T and the lower end 10B, and the inner layer body 3 easily separates from the outer layer body 2 at the upper end 10T or the lower end 10B. Therefore, a process of separating the inner layer body 3 from the outer layer body 2 and a subsequent process of restoring the inner layer body 3 to the original shape can be performed smoothly, and the intended gap can be easily formed between the inner layer body 3 and the outer layer body 2 at the position of the vertical rib 10.

The vertical rib 10 in this embodiment smoothly connects to the outer surface of the shoulder portion 7 at the upper end 10T and the lower end 10B. With such a structure, the inner layer body 3 can be separated more smoothly at the position of the upper end 10T or the lower end 10B of the vertical rib 10 in the initial separation treatment.

In this embodiment, the lower end 10B of the vertical rib 10 is located above the lower end of the shoulder portion 7. For example, in the case where the vertical rib 10 extends from the shoulder portion 7 to the barrel portion 5 so that the lower end 10B is located in the barrel portion 5, there is a possibility that the inner layer body 3 is not easily separated at the lower end 10B in the initial separation treatment. By locating the lower end 10B of the vertical rib 10 in the shoulder portion 7 as in this embodiment, on the other hand, the inner layer body 3 can be easily separated. The vertical rib 10 may extend from the shoulder portion 7 to the barrel portion 5 so that the lower end 10B is located in the barrel portion 5.

As illustrated in FIG. 2, each vertical rib 10 extends in the radial direction of the synthetic resin-made container 1 in a planar view of the synthetic resin-made container 1. Moreover, each vertical rib 10 extends approximately linearly from the upper end 10T to the lower end 10B. However, the present disclosure is not limited to such, and each vertical rib 10 may be bent or curved.

As illustrated in FIGS. 1 and 2, the width (the groove width of the part open to the outer surface of the shoulder portion 7 in a direction perpendicular to the extending direction) of each vertical rib 10 is smaller in the upper end 10T and the lower end 10B, i.e. each vertical rib 10 tapers down toward the upper end 10T and the lower end 10B. With such a structure, the separability of the inner layer body 3 at the vertical rib 10 can be further enhanced.

Each vertical rib 10 may be a convex rib projecting from the surface of the shoulder portion 7 toward the outside of the container. In such a case, the projection height of the vertical rib 10 is preferably smaller at least in the upper end 10T or the lower end 10B than in the central part 10M. In this case, the cross-sectional shape of the vertical rib 10 is a convex shape in the inner layer body 3 corresponding to the convex shape in the outer layer body 2.

Figure 3A:
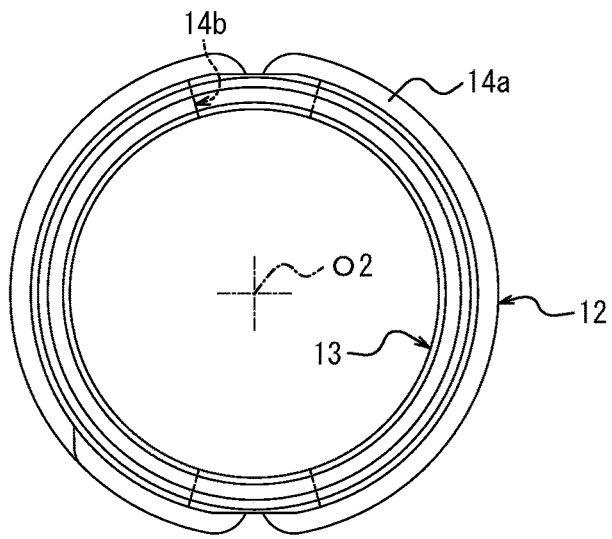
FIG. 3A is a plan view of a preform according to one of the disclosed embodiments.
Figure 3B:
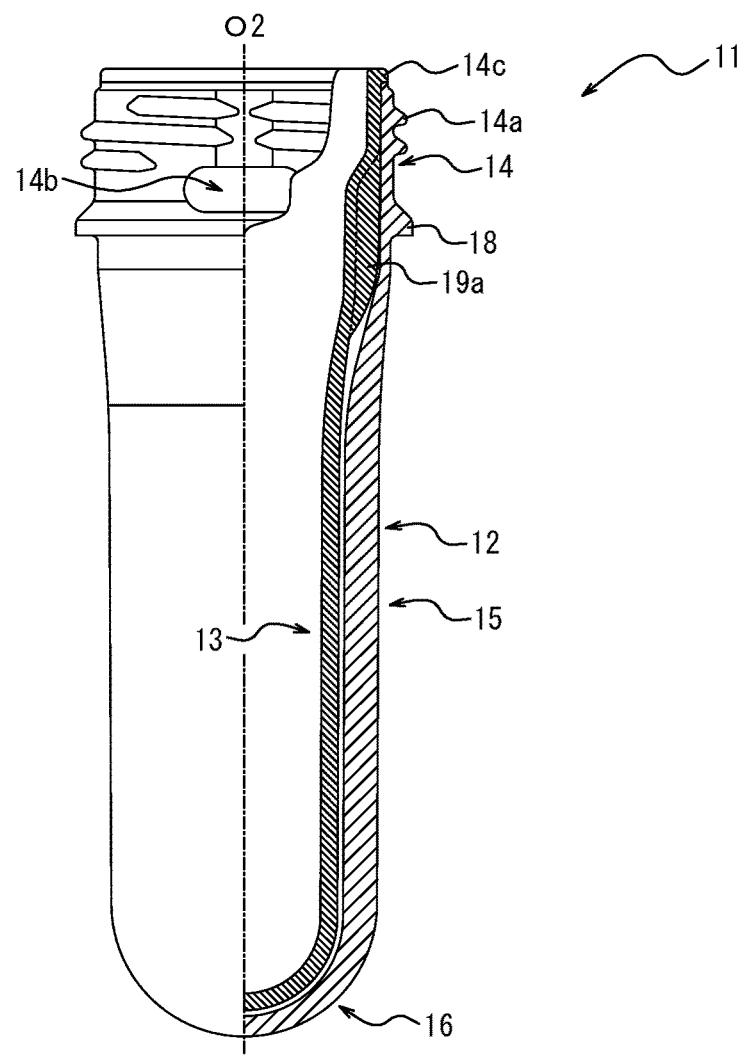
FIG. 3B is a partial front sectional view of the preform according to one of the disclosed embodiments.

The synthetic resin-made container 1 can be formed by stretch blow molding the synthetic resin-made preform 11 according to one of the disclosed embodiments illustrated in FIGS. 3A and 3B.

The preform 11 has a double structure including a synthetic resin-made outer body 12 for forming the outer layer body 2 and a synthetic resin-made inner body 13 for forming the inner layer body 3. The external shape of the preform 11 is a bottomed tubular shape (approximately test tube shape) including a cylindrical mouth portion 14, a cylindrical barrel portion 15 connected to and located below the mouth portion 14, and a bottom portion 16 closing the lower end of the barrel portion 15. The mouth portion 14 is formed in a shape corresponding to the mouth portion 4 of the synthetic resin-made container 1, and has a male screw 14a and an outside air introduction hole 14b formed through the outer body 12. The bottom portion 16 is formed in a curved shape (semispherical shape). An open part at the upper end of the inner body 13 is provided with an annular flange 14c projecting radially outward. As a result of the flange 14c being laid over (placed on) the open end of the outer body 12, the open part of the inner body 13 is fixed to the open end. Reference sign O2 is a central axis common to the mouth portion 14, the barrel portion 15, and the bottom portion 16.

The outer body 12 may be made of the same synthetic resin material as the outer layer body 2, i.e. a synthetic resin material that is stretch blow moldable, such as polyethylene terephthalate (PET), polypropylene (PP), or polyethylene (PE). The inner body 13 may be made of the same synthetic resin material as the inner layer body 3, i.e. a synthetic resin material such as polyethylene terephthalate (PET), nylon, or ethylene-vinyl alcohol copolymer resin (EVOH). The inner body 13 is thinner than the outer body 12, and is laminated on the inner surface of the outer body 12 so as to cover the whole inner surface. The inner body 13 may be a single layer structure formed by only a single synthetic resin, or may be a structure formed by a plurality of synthetic resins (e.g. PET/Ny/PET or PET+Ny blend) in order to improve barrier property or content resistance.

Figure 4:
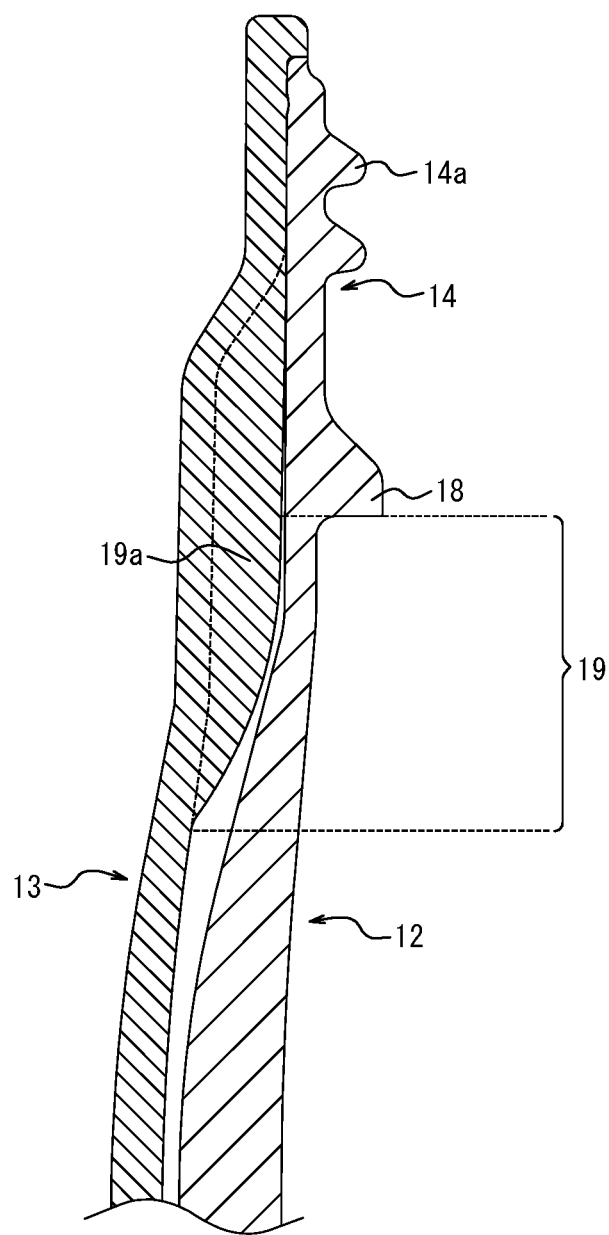
FIG. 4 is an enlarged sectional view of a mouth portion in FIG. 3B.

A crystallized region 19 is formed below the neck ring 18 in the inner body 13, as illustrated in FIG. 4. The crystallized region 19 is a region whose degree of crystallinity has been increased, for example, by slow cooling the crystalline resin after heating, as mentioned above. In this embodiment, the crystallized region 19 has its degree of crystallinity increased to such an extent that whitens the inner body 13. Thus, the rigidity of the inner body 13 in the region can be enhanced to prevent the inner body 13 from expanding radially outward during the stretch blow molding and thus secure the air passage for outside air.

Figure 5A:
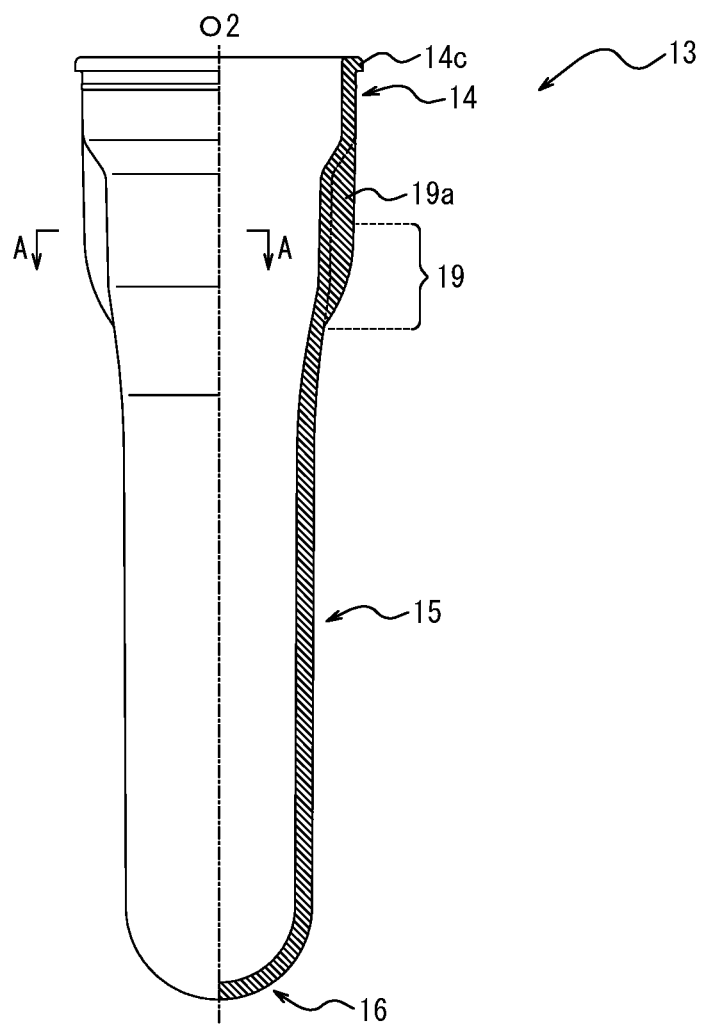
FIG. 5A is a partial front sectional view of an inner body included in the preform according to one of the disclosed embodiments.
Figure 5B:
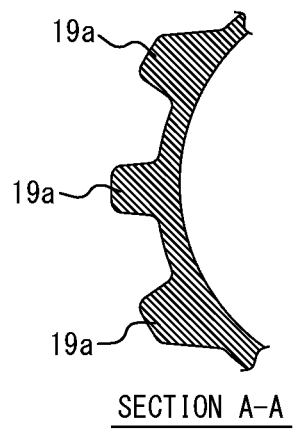
FIG. 5B is a sectional view along section A-A in FIG. 5A.

Air passage ribs 19a are formed in the crystallized region 19 of the inner body 13, as illustrated in FIG. 5B. In this embodiment, the air passage ribs 19a project radially outward from the outer circumferential surface in the mouth portion 14. Three air passage ribs 19a on the left and three air passage ribs 19a on the right in FIG. 5A are arranged symmetrically with respect to the outside air introduction hole 14b. Each air passage rib 19a extends in the vertical direction from above the outside air introduction hole 14b in the mouth portion 14 of the preform 11 to the lower end of the crystallized region 19, as illustrated in FIGS. 3A, 3B, and 4. By forming the air passage ribs 19a at such a height position that includes at least a part of the crystallized region 19 in this way, not only an air passage can be secured by improvement in the rigidity of the inner body 13 in the crystallized region 19 but also a wider air passage can be secured through the space between the air passage ribs 19a. Consequently, in the synthetic resin-made container 1 obtained by stretch blow molding the preform 11, outside air introduced from the outside air introduction hole 4b can be smoothly supplied to the barrel portion 5. In this embodiment, the air passage ribs 19a extend upward to the height of the outside air introduction hole 14b, so that outside air introduced from the outside air introduction hole 14b can be more smoothly supplied to the barrel portion 5 through the air passage ribs 19a.

In this embodiment, the air passage ribs 19a extend from the outside air introduction hole 14b to the crystallized region 19. However, the present disclosure is not limited to such, as long as the air passage ribs 19a are formed at least at such a height position that includes a part of the crystallized region 19.

In this embodiment, three air passage ribs 19a on the left and three air passage ribs 19a on the right are arranged symmetrically with respect to the outside air introduction hole 14b. However, the present disclosure is not limited to such, as long as at least one air passage rib 19a is provided. The number of air passage ribs 19a and the spacing between the air passage ribs 19a can be freely determined.

A method of manufacturing the synthetic resin-made container 1 according to one of the disclosed embodiments will be described below.

FIG. 6 is a flowchart illustrating a procedure of performing the method of manufacturing the synthetic resin-made container 1 according to this embodiment.

A method of forming the preform 11 for manufacturing the synthetic resin-made container 1 by stretch blow molding will be described first. First, the outer body 12 illustrated in FIGS. 3A and 3B is molded by injection molding (step S101). Along with the molding of the outer body 12, the inner body 13 illustrated in FIGS. 3A, 3B, 5A, and 5B is molded by another injection molding process (step S102). Although the molding of the outer body 12 is followed by the molding of the inner body 13 in FIG. 6, the molding order is not limited, as the outer body 12 and the inner body 13 can be molded independently of each other. The molding of the outer body 12 and the inner body 13 is not limited to injection molding, and other molding methods such as compression molding may be used.

Next, the crystallized region 19 is formed in the inner body 13 molded in step S102 (step S103). For example, the crystallized region 19 can be formed by, after the injection molding of the inner body 13 is completed and the inner body 13 is rapidly cooled, reheating only a predetermined region below the neck ring 18 and then slow-cooling the predetermined region without performing forced cooling such as air cooling using a fan. To reheat only the predetermined region below the neck ring 18, for example, the regions other than the predetermined region are masked. Alternatively, the crystallized region 19 may be formed by, when molding the inner body 13 by injection molding, slow-cooling only the predetermined region in a process of cooling the resin from the molten state. In this embodiment, crystallization treatment is performed to increase the degree of crystallinity to such an extent that whitens the crystallized region 19. However, the present disclosure is not limited to such. For example, the crystallized region 19 may be formed by performing crystallization treatment so that the crystallized region 19 has predetermined rigidity (modulus of longitudinal elasticity).

Next, the outer circumferential surface of the inner body 13 in which the crystallized region 19 has been formed in step S103 is fitted onto the inner circumferential surface of the outer body 12, to form the preform 11 (step S104). In the formation of the preform 11, the inner body 13 is positioned relative to the outer body 12 in the vertical direction, as a result of the annular flange 14c which projects radially outward from the upper end of the mouth portion 14 of the inner body 13 abutting the open end of the outer body 12 from above, as illustrated in FIGS. 3A and 3B. Moreover, for example, the inner body 13 and the outer body 12 may be positioned relative to each other in the circumferential direction by fitting a protrusion formed on the outer circumferential surface of the inner body 13 into a depression formed on the inner circumferential surface of the outer body 12.

Next, the preform 11 formed in step S104 is stretch blow molded to produce the synthetic resin-made container 1 which is a delamination container (step S105). In the stretch blow molding, first, the preform 11 is heated in a heating furnace. Following this, from the heating state of the preform 11, the neck ring 18 of the preform 11 is caused to abut a reference plane of a mold for blow molding to be fixed to the mold, and the preform 11 is stretch blow molded. Consequently, the outer body 12 and the inner body 13 are blow molded radially outward by high pressure air, while being stretched downward by a stretching rod. Here, since an unstretched part below the neck ring 18 in the mouth portion 14 of the preform 11 does not stretch downward, the inner body 13 tends to expand radially outward due to the pressure of high pressure air blown into the preform 11. In this embodiment, however, the crystallized region 19 having a high degree of crystallinity and a high elastic modulus is provided in the region below the neck ring 18 which is the unstretched part of the mouth portion 14, so that the region can be prevented from expanding radially outward due to high pressure air. Hence, an air passage for outside air from the outside air introduction hole 14b to the barrel portion 15 can be easily secured.

Although the mouth portion 4 and the barrel portion 5 have an approximately cylindrical shape in this embodiment, the present disclosure is not limited to such. For example, the mouth portion 4 and the barrel portion 5 may have a rectangular tubular shape or an elliptic tubular shape. Likewise, although the mouth portion 14 and the barrel portion 15 in the preform 11 have an approximately cylindrical shape in this embodiment, the present disclosure is not limited to such, and the mouth portion 14 and the barrel portion 15 may have, for example, a rectangular tubular shape or an elliptic tubular shape.

As described above, in the synthetic resin-made container 1 according to this embodiment, the inner layer body 3 is made of a crystalline resin, and has, in at least a part of the mouth portion 4 in the inner layer body 3, the crystallized region 9 having a higher degree of crystallinity than the other regions. Thus, in the case of forming the synthetic resin-made container 1 by stretch blow molding the preform 11 having the outer body 12 and the inner body 13, the inner body 13 can be prevented from expanding radially outward due to high pressure air and narrowing the air passage in part of the mouth portion 14. The air passage from the outside air introduction hole 4b to the space between the outer layer body 2 and the inner layer body 3 in the barrel portion 5 can therefore be easily secured.

In the synthetic resin-made container 1 according to this embodiment, the visible light transmittance in the crystallized region 9 is lower than that in the other regions. Thus, the state in which the degree of crystallinity in the crystallized region 9 has increased to enhance the elastic modulus can be determined and managed based on the appearance.

In the synthetic resin-made container 1 according to this embodiment, the crystallized region 9 is formed in the predetermined region below the neck ring 8 formed in the mouth portion 4. Thus, the region below the neck ring 8 which tends to expand radially outward in the stretch blow molding of the preform 11 can be enhanced in rigidity to resist deformation. The air passage from the outside air introduction hole 4b to the space between the outer layer body 2 and the inner layer body 3 in the barrel portion 5 can therefore be easily secured.

In the synthetic resin-made container 1 according to this embodiment, the shoulder portion 7 has the concave or convex vertical rib 10 extending in the vertical direction. This allows outside air introduced from the outside air introduction hole 4b to reach the barrel portion 5 through the gap between the outer layer body 2 and the inner layer body 3 at the vertical rib 10.

In the synthetic resin-made container 1 according to this embodiment, the groove depth of the vertical rib 10 is smaller in the upper end 10T and the lower end 10B than in the central part 10M. Thus, the inner layer body 3 can easily separate from the outer layer body 2 at the vertical rib 10 in the initial separation treatment of the inner layer body 3.

In the synthetic resin-made container 1 according to this embodiment, the crystallized region 9 extends to the upper end 10T of the vertical rib 10. This allows outside air introduced from the outside air introduction hole 4b through the air passage secured in the crystallized region 9 to easily reach the barrel portion 5 through the gap between the outer layer body 2 and the inner layer body 3 at the vertical rib 10.

In the preform 11 according to this embodiment, the inner body 13 is made of a crystalline resin, and has, in at least a part of the mouth portion 14 in the inner body 13, the crystallized region 19 having a higher degree of crystallinity than the other regions. Thus, in the case of forming the synthetic resin-made container 1 by stretch blow molding the preform 11, the inner body 13 can be prevented from expanding radially outward due to high pressure air and narrowing the air passage in part of the mouth portion 14. The air passage from the outside air introduction hole 4b to the space between the outer layer body 2 and the inner layer body 3 in the barrel portion 5 can therefore be easily secured.

In the preform 11 according to this embodiment, the crystallized region 19 is an unstretched part in the stretch blow molding. Thus, in the case of forming the synthetic resin-made container 1 by stretch blow molding the preform 11, the inner body 13 can be prevented from expanding radially outward due to high pressure air and narrowing the air passage in the unstretched part of the mouth portion 14. The air passage from the outside air introduction hole 4b to the space between the outer layer body 2 and the inner layer body 3 in the barrel portion 5 can therefore be easily secured.

In the preform 11 according to this embodiment, the air passage rib 19a extending in the vertical direction is formed on the outer circumferential surface in the crystallized region 19. Thus, not only an air passage can be secured by improvement in the rigidity of the inner body 13 in the crystallized region 19 but also a wider air passage can be secured through the space between the air passage ribs 19a. Consequently, in the synthetic resin-made container 1 obtained by stretch blow molding the preform 11, outside air introduced from the outside air introduction hole 4b can be more smoothly supplied to the barrel portion 5.

In the preform 11 according to this embodiment, the air passage rib 19a extends from the outside air introduction hole 14b to the crystallized region 19. Thus, in the synthetic resin-made container 1 formed by stretch blow molding the preform 11, outside air introduced from the outside air introduction hole 4b can be seamlessly supplied to the barrel portion 5 through the air passage secured by the crystallized region 9 and the air passage secured by the air passage rib 19a.

The method of manufacturing the synthetic resin-made container 1 according to this embodiment includes heating and cooling at least a part of the mouth portion 14 in the inner body 13 to form the crystallized region 19 having a higher degree of crystallinity than the other regions. Thus, by a simple process of heating and cooling part of the mouth portion 14, the inner body 13 can be prevented from expanding radially outward due to high pressure air and narrowing the air passage in part of the mouth portion 14. The air passage from the outside air introduction hole 4b to the space between the outer layer body 2 and the inner layer body 3 in the barrel portion 5 can therefore be easily secured.

In the method of manufacturing the synthetic resin-made container 1 according to this embodiment, the cooling of the at least a part of the mouth portion 14 in the inner body 13 is slow cooling without forced cooling. Thus, by a simple process of slow cooling without forced cooling, the inner body 13 can be prevented from expanding radially outward due to high pressure air and narrowing the air passage in part of the mouth portion 14. The air passage from the outside air introduction hole 4b to the space between the outer layer body 2 and the inner layer body 3 in the barrel portion 5 can therefore be easily secured.

Although the disclosed technique has been described by way of the drawings and embodiments, various changes or modifications may be easily made by those of ordinary skill in the art based on the present disclosure. Such various changes or modifications are therefore included in the scope of the present disclosure. For example, the functions included in the components, etc. may be rearranged without logical inconsistency, and a plurality of components, etc. may be combined into one component, etc. and a component, etc. may be divided into a plurality of components, etc. These are also included in the scope of the present disclosure.

EXAMPLES

The preform 11 was produced using IPA (isophthalic acid)-modified PET (IV value: 0.8) as the material of the outer body 12 and the inner body 13. The density in the whitened part (crystallized region 19) of the mouth portion 14 was 1.37 [g/cm$^3$], and the density in the parts other than the whitened part was 1.33 [g/cm$^3$]. When a density of 1.35 [g/cm$^3$] or more was secured in the crystallization of the mouth portion 14, outside air was able to be introduced from the outside air introduction hole 4b in the synthetic resin-made container 1 after stretch blow molding.

In the case of using PET resin as the material of the outer body 12 and the inner body 13, PET resins other than IPA-modified PET, such as CHDM-modified PET or homo-PET, may be used.

REFERENCE SIGNS LIST 1 synthetic resin-made container
2 outer layer body
3 inner layer body 4 mouth portion
4a male screw
4b outside air introduction hole
5 barrel portion
6 bottom portion
7 shoulder portion
8 neck ring
9 crystallized region
10 vertical rib
10B lower end
10M central part
10T upper end
11 preform
12 outer body
13 inner body
14 mouth portion
14a male screw
14b outside air introduction hole
14c flange
15 barrel portion
16 bottom portion
18 neck ring
19 crystallized region
19a air passage rib
O1, O2 central axis
S containing portion

The invention claimed is:

1. A synthetic resin-made container that has an outer layer body and an inner layer body separably laminated on an inner surface of the outer layer body and is formed by stretch blow molding, the synthetic resin-made container comprising:
   a tubular mouth portion;
   a shoulder portion located below the mouth portion and increasing in diameter downward;
   a barrel portion connected to and located below the shoulder portion; and
   a bottom portion closing a lower end of the barrel portion,
   wherein the mouth portion has an outside air introduction hole for introducing outside air into a space between the outer layer body and the inner layer body,
   the inner layer body is made of a crystalline resin, and has, in at least a part of the mouth portion in the inner layer body, a crystallized region having a higher degree of crystallinity than other regions,
   the shoulder portion has a vertical rib extending in a vertical direction, the vertical rib being concave or convex,
   a groove depth of the vertical rib that is concave or a projection height of the vertical rib that is convex is smaller in at least one of an upper end and a lower end of the vertical rib than in a center of the vertical rib, and
   the upper end of the vertical rib is an end nearer to the mouth portion, the lower end of the vertical rib is an end nearer to the barrel portion, and the center of the vertical rib is between the upper end and the lower end.

2. The synthetic resin-made container according to claim 1, wherein the crystallized region has lower visible light transmittance than the other regions.

3. The synthetic resin-made container according to claim 1, wherein the crystallized region is a predetermined region below a neck ring formed in the mouth portion.

4. The synthetic resin-made container according to claim 1, wherein the crystallized region extends to at least the upper end of the vertical rib.

5. A preform that is made of a synthetic resin, has an outer body and an inner body laminated on an inner surface of the outer body, and is used in stretch blow molding, the preform comprising:
   a tubular mouth portion;
   a barrel portion located below the mouth portion; and
   a bottom portion closing a lower end of the barrel portion,
   wherein the mouth portion has an outside air introduction hole formed through the outer body,
   the inner body is made of a crystalline resin, and has, in at least a part of the mouth portion in the inner body, a crystallized region having a higher degree of crystallinity than other regions,
   an air passage rib extending in a vertical direction is formed on an outer circumferential surface in at least a part of the crystallized region, and
   the air passage rib extends from above the outside air introduction hole to the crystallized region.

6. The preform according to claim 5, wherein the crystallized region is an unstretched part in the stretch blow molding.

7. A method of manufacturing a synthetic resin-made container by stretch blow molding a preform that has an outer body and an inner body laminated on an inner surface of the outer body, the preform including: a tubular mouth portion; a barrel portion located below the mouth portion; and a bottom portion closing a lower end of the barrel portion, wherein the mouth portion has an outside air introduction hole formed through the outer body, the method comprising:
   molding the outer body and the inner body that is made of a crystalline resin;
   reheating and cooling at least a part of the mouth portion in the inner body, to form a crystallized region having a higher degree of crystallinity than other regions;
   fitting the inner body having the crystallized region onto an inner circumferential surface of the outer body, to form a preform; and
   stretch blow molding the preform to form a synthetic resin-made container,
   wherein the synthetic resin-made container includes a shoulder portion located below a mouth portion corresponding to the mouth portion of the preform, above a barrel portion corresponding to the barrel portion of the preform, and increasing in diameter downward,
   the shoulder portion has a vertical rib extending in a vertical direction, the vertical rib being concave or convex,
   a groove depth of the vertical rib that is concave or a projection height of the vertical rib that is convex is smaller in at least one of an upper end and a lower end of the vertical rib than in a center of the vertical rib, and
   the upper end of the vertical rib is an end nearer to the mouth portion of the synthetic resin-made container, the lower end of the vertical rib is an end nearer to the barrel portion of the synthetic resin-made container, and the center of the vertical rib is between the upper end and the lower end.

8. The method of manufacturing a synthetic resin-made container according to claim 7, wherein the cooling of the at least a part of the mouth portion in the inner body is slow cooling without forced cooling.

* * * * *